Sept. 13, 1966 R. F. BLAKEWELL ETAL 3,272,311
FRUIT ORIENTOR
Filed May 3, 1965 3 Sheets-Sheet 1

INVENTORS
ROLAND F. BLAKEWELL
LAURENCE H. SMITH
BY MALCOLM W. LOVELAND

THEIR ATTORNEYS

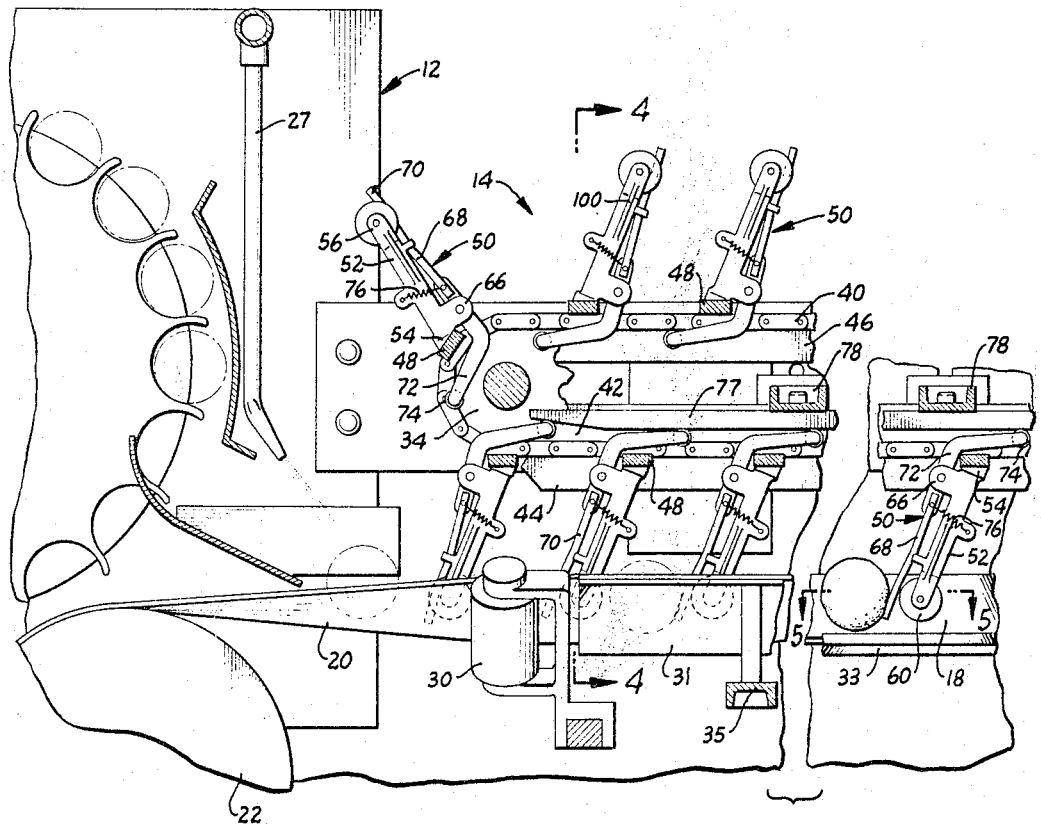

Sept. 13, 1966    R. F. BLAKEWELL ETAL    3,272,311
FRUIT ORIENTOR

Filed May 3, 1965    3 Sheets-Sheet 3

INVENTORS
ROLAND F. BLAKEWELL
LAURENCE H. SMITH
BY MALCOLM W. LOVELAND

THEIR ATTORNEYS

United States Patent Office 3,272,311
Patented Sept. 13, 1966

3,272,311
FRUIT ORIENTOR
Roland F. Blakewell, Oakland, Laurence H. Smith, Walnut Creek, and Malcolm W. Loveland, Orinda, Calif., assignors to Atlas-Pacific Engineering Co., a corporation of California
Filed May 3, 1965, Ser. No. 452,479
7 Claims. (Cl. 198—33)

This invention relates to an orienting machine for fruit having a somewhat oval shape and particularly to a machine which is adapted for the orientation of apricots.

In many fruit processing operations it is necessary to have the fruit oriented in a desired direction in order to carry on some operation such as splitting, peeling, coring or the like. Many fruits have a deep suture, such as in the peach, or a deep depression, such as in the apple, or are asymmetric from end to end, such as the pear, so that such fruits are relatively easy to orient, utilizing mechanisms well known to those skilled in the art. However, apricots vary from strongly oval in cross section to almost round, and ordinarily have only a very shallow suture. In some varieties of apricots, the suture is almost entirely lacking, so it is thus apparent that means for orienting other fruits cannot be applied with success to apricots. It is nevertheless desirable to cut the apricot on or very near to the suture plane. The great majority of apricots, even those which appear round, have a diameter normal to the suture plane which is measurably less than the other diameters of the apricot. By providing a system which refers to this minor diameter as its orienting principle it is possible to successfully orient the majority of apricots automatically.

It is therefore an object of the present invention to provide an orienting device for fruit which has an oval shape no matter how slight, such as apricots.

Another object of this invention is to provide an orientor which is simple in mechanical construction and which is capable of operating automatically at high throughputs.

Another object is to provide a comparatively compact automatic orientor with a high throughput.

Still another object of this invention is to provide a fruit orienting device for apricots which employs a combination of orienitng means so that the fruit can be oriented by a bar or by rollers as required by the fruit characteristics, or by a combination of these orienting methods.

Other objects will be apparent from the balance of the specification.

In the drawings forming a part of this application:

FIGURE 3 is an enlarged side view of the feed end of the orienting machine.

FIGURE 4 is a section on the line 4—4 of FIGURE 3.

FIGURE 5 is a section on the line 5—5 of FIGURE 3.

Figure 1:
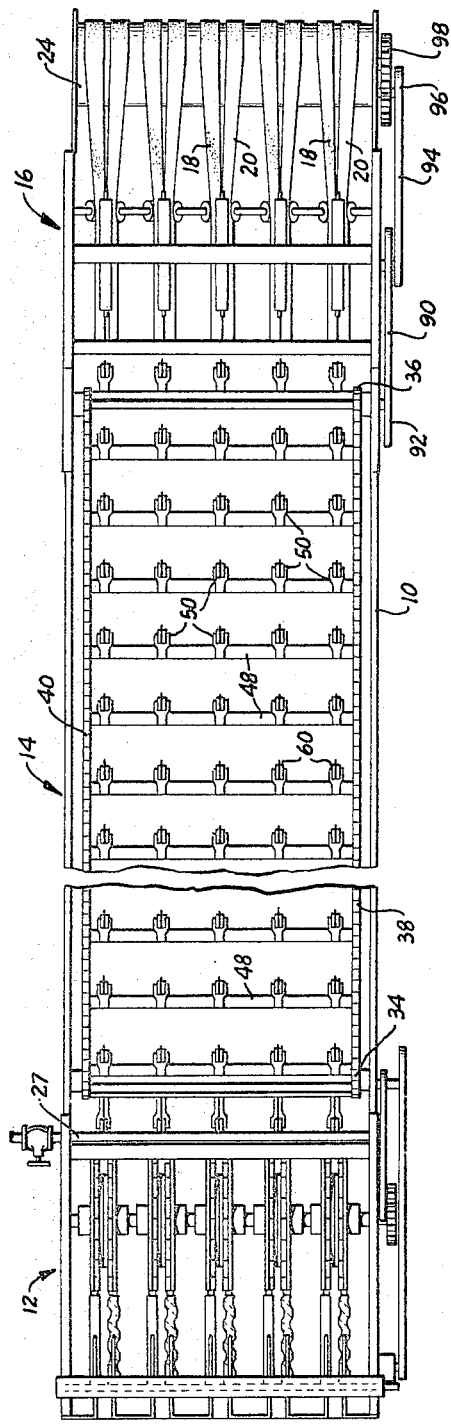
FIGURE 1 is a plan view of a machine embodying the present invention.

Turning now to a description of the drawings by reference characters, there is shown an orienting machine having an frame 10, having a feeding and segregating section 12 at one end thereof, an orienting mechanism 14 at the center thereof, and a splitting mechanism 16 at the discharge end thereof. The frame is mounted on legs, each of which can be lengthened or shortened utilizing screw means 11 and 13. The particular feeding mechanism and the splitting mechanism form no part of the present invention and will not be described, it being understood that the orienting device of the present invention will operate with any feed device which will feed one fruit at a time in synchronism with the machine, or even handfed, and that some operation other than splitting might be performed after the fruit is oriented or that some different form of splitting mechanism might be employed. In the machine illustrated, five orienting lanes are provided, but only one of such lanes will be described, it being understood that the machine might be built with a larger or smaller number of orienting lanes.

Each orienting lane includes a pair of belts made up of the belts 18 and 20 which may be of rubber, plastic, or other suitable material which will resist moisture. The belts should be of sufficient width so that the two points of tangency between the belt and largest fruit always remain safely below the top edges of the belts. The belts pass over pairs of pulleys 22 and 24 so that there is a relatively long, horizontal run of the belts as at 26. The pulleys 22 and 24 have a one-sided crown which causes the belts to track away from each other to compensate for the unusual twist given the belts to form the V. The pulleys 24 are driven, by means hereinafter described, and the belts may have any desired return path as at 28 over various idler pulleys as shown. Rollers 30 and 32 at each end of the machine tilt belt 20 while similar rollers, not illustrated, tilt belt 18, so that the belts, during their horizontal travel, make an angle with each other of approximately 70° at the start of orientation and 50° at the finish with a small gap between the belts at the bottom of the V. Between rolls 30 and 32 the belts 18 and 20 are supported and guided by shoes 31 and 33 which are in turn supported from frame 10 by members 35. These shoes prevent the belt from sagging in the horizontal run 26 and their lower edges encompass the edges of the belts so that the belts cannot sag laterally nor wobble to close the gap between the belts. Shoes 31 and 33 are twisted to conform to the 70° and 50° angles provided by rollers 30 and 32. Thus, during the horizontal run 26, the two belts form a V-shaped trough with a discontinuous center portion. It is important that the belts be kept wet and washed free of sticky fruit residue; this is accomplished by a water spray 27 on the belts 18 and 20 at the start of orienting.

Mounted over the horizontal portion of the machine are two pairs of sprockets 34 and 36, about which are trained endless chains 38 and 40. The chains are supported throughout their lower horizontal run by an upper guide 42 and a lower guide 44 which form a slot therebetween through which the chains pass maintaining the chains during their lower horizontal run in exactly the desired position. A track 46 supports the chain during its upper horizontal run. Extending between the two chains at suitable intervals are the cross bars 48. Attached to each of the cross bars are a number of orientors generally designated 50, the number attached to each bar corresponding to the number of orienting lanes in the particular machine.

Figure 6:
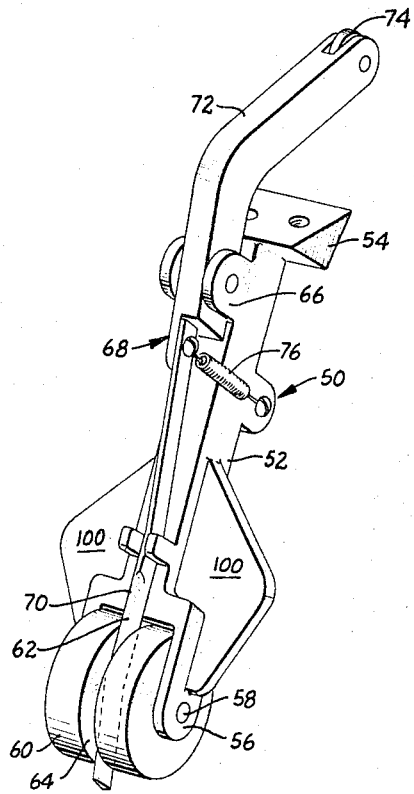
FIGURE 6 is an enlarged perspective view of one of the orienting arms.

In a preferred embodiment of the invention the orienting mechanisms 50 comprise an arm 52 having an enlarged end 54 for attaching the arm to one of the bars 48. The lower portion of the member 52 is forked as at 56 with an axle 58 passing therethrough on which there is a roller 60 having a groove 64 in the center. The member 52 also has a pair of bosses 66 in which an orienting lever, generally designated 68, is pivoted. One end of the lever as at 70 is a narrow bar which can pass in the groove 64 in the roller 60; the portion of the bar 70 which contacts the fruit has a small rounded edge 62. The upper end 72 is enlarged and has a cam follower roller 74 therein. A spring 76 normally biases the bar into a retracted position in the roller as is shown in FIGURE 6. The axis 58 of roller 60 is preferably about on the same level as the center of the fruit being run. If a great range of fruit sizes is to be run, provision may be made to adjust the height of the rollers in relation to the belts.

Mounted over the lower run of the chains 38 and 40 are a plurality of cam tracks 77. These are held on cross members 78 and the number of cam tracks will correspond with the number of orienting lanes in the machine. Normally at the feed end, the cam track will be depressed as is shown in FIGURE 3 so that the bar 70 will extend beyond the roller. The cam track is divided into two sections such as are designated 77A and 77B in FIGURE 2 with means 79 for adjusting the height of the individual sections. Thus, the track may be raised so that the spring 76 will retract the bar beneath the surface of the rollers, or lowered so that the bar will extend beyond the rollers.

The machine can be driven by any suitable means such as an electric motor 88 having an endless chain 90 driving a sprocket 92 on the same shaft as sprockets 36, driving chains 38 and 40. The motor also drives a second roller chain 94, driving the sprocket 96 which is geared to gear 98 which in turn drives the belts 18 and 20.

Figure 11:
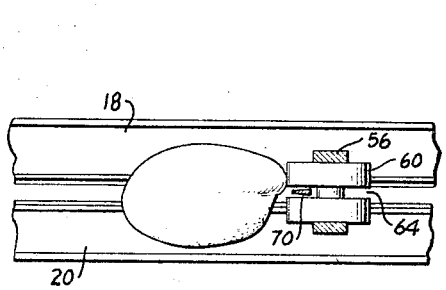
FIGURE 11 is a section similar to section 8—8 of FIGURE 7, showing a fruit with unequal halves.

The belts 18 and 20 are driven at a substantially higher rate of speed than the chains 38 and 40 which carry the orienting arms. The fruit is propelled forward and into the orienting arms and thus given a rolling motion so that as it is moved forward by the belt, the orienting arms tend to hold the fruit back. With very irregular fruit, it has been found desirable to incline the horizontal run of the belts downwards as much as 15° to insure continuous contact of the fruit with the wheel 60 and bar 70. This can be accomplished by adjusting the legs as at 11 and 13. With a fruit of oval cross section such as apricots the rolling motion thus imparted causes the apricot to seek the orientation wherein its center of gravity is lowest in the V formed by belts 18 and 20. This condition obtains when the apricot has positioned its minor axis horizontal and transverse to the belts 18 and 20. It has been found that the bar type orientor 70 produces a quicker orienting action than the wheel 60 beginning with a random orientation. If the apricots are nearly round and with almost no suture the bar will give excellent orienting when used alone, that is without the wheel. However, many varieties of apricots have unequal sized halves as is shown in FIGURE 11. The inequality does not extend completely around the apricot but generally begins at the stem end and follows the suture, diminishing to nothing at the blossom end. The balance of the circumference is generally reasonably symmetrical.

When the bar 70 is used alone, each time the unequal portion encounters the bar the apricot veers to one side, and so develops a wobbly action and never settles down on one plane. By having bar 70 extended beyond the roller during the initial orienting time, advantage is taken of the orienting speed of the bar to bring the apricot into approximate orientation. The pin is then retracted into the groove 64 so that the apricot only contacts the wheel 60. As the inequalities pass, they are scarcely disturbed by the wheel and the apricot settles down and maintains a single plane of rotation which is normal to the minor axis of the fruit. Thus, depending on the kind of fruit being run, orientation can be effected by the bar alone or the combination of the bar and roller in order to secure the best final results. The belt speed is about double the chains 38 and 40 speed. There is generally an upper limit to the speed of rotation of the apricot during orienting. This limit is reached when the apricot begins to bounce because of its normal irregularities. In one preferred embodiment of the invention, the belts had a linear speed of 112 feet per minute, while the orienting arms were propelled at a rate of 54 feet per minute.

Figure 8:
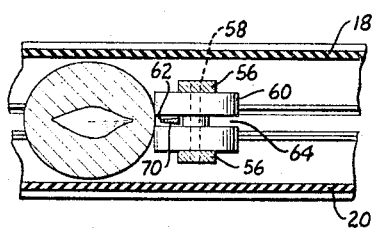
FIGURE 8 is a section on the line 8—8 of FIGURE 7.
Figure 7:
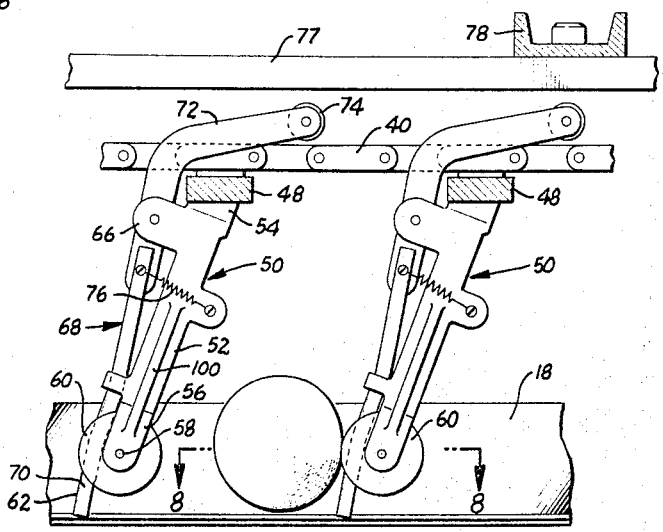
FIGURE 7 is a side view of two orienting arms showing one phase of the operation.

In handling round fruits with a shallow suture, the bar may be extended as is shown in FIGURES 3 and 5, while in handling oval fruits the pin may be retracted as is shown in FIGURES 7 and 8. Normally a combination is used so that during the early part of the run of the orientor, the fruit is in contact with the bar and during the latter part of the run, the fruit is in contact with the roller. This results in rapid yet accurate orientation of the fruit regardless of its particular configuration.

Figure 9:
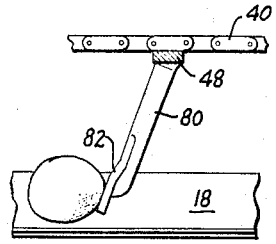
FIGURE 9 is a partial view showing an embodiment of the machine employing only an orienting bar structure.
Figure 10:
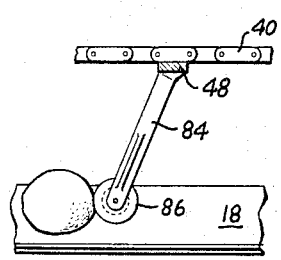
FIGURE 10 is a view similar to FIGURE 9, showing an embodiment wherein only rollers are used.

Under some conditions, the machine might be built with only the orienting bar or with only the orienting rollers. Thus there is shown in FIGURE 9 a support member 80 having a thin orienting bar structure 82 thereon. In FIGURE 10, the support structure 84 holds only rollers 86. Thus in handling certain specialized fruits in large quantity, the machine can be simplified so that it has only the bar or only the rollers.

Since the belts are moving substantially faster than the orienting arms, there is sometimes a tendency for small or defective fruit to be propelled past an orienting arm and into the compartment formed by the next two adjacent arms. To prevent this, it is preferred that the orienting arms carry wings 100 which effectively close the space between the orienting arms and the infolded belts so that if defective fruit tries to jump past one arm, it is elevated high enough so that it falls to one side off the belts 18 and 20.

Figure 2:
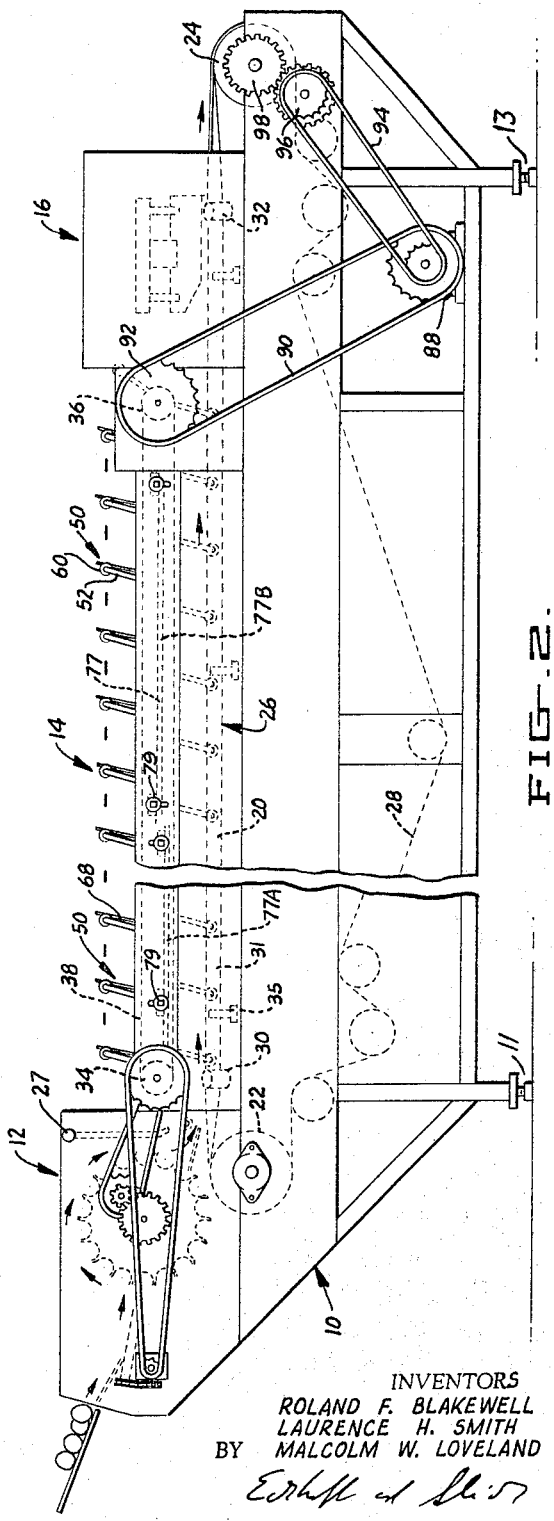
FIGURE 2 is a side view of the machine shown in FIGURE 1.

At the discharge end of the machine, the fruit may be subjected to another operation such as splitting, which is diagrammatically shown at 16 in FIGURES 1 and 2.

We claim:
1. A fruit orientor or the like comprising in combination:
 (a) a pair of flat belts having a substantially horizontal run, said belts having their outer edges deflected upward and toward each other, whereby a V-shaped trough is formed therebetween;
 (b) a plurality of orienting arms, said arms extending downwardly into the V-shaped space between the belts, said spaced arms defining pockets therebetween;
 (c) means for driving said belts on said horizontal run;
 (d) means for driving said orienting arms on substantially the same horizontal path, said belts being driven at a substantially higher rate of speed than said orienting arms, whereby said orienting arms are brought into contact with fruit being carried by said belts.

2. The structure of claim 1 wherein the orienting arms are in the form of a bar.

3. The structure of claim 1 wherein the orienting arms are in the form of a roller.

4. The structure of claim 1 wherein the orienting arms have a grooved roller with an orienting bar within the roller groove with means whereby the bar can be extended beyond the roller and withdrawn within the roller.

5. The structure of claim 4 wherein said means comprises a cam track mounted over said orienting arms.

6. The structure of claim 5 wherein the cam track includes a plurality of sections, with means for individually adjusting each section.

7. A structure as in claim 1 wherein the flat belts tilt downwardly in the direction of travel of the belts whereby gravity assists in urging fruit against the orienting arms.

References Cited by the Examiner

UNITED STATES PATENTS

| 2,293,133 | 8/1942 | Halferty | 146—73 X |
| 2,735,465 | 2/1956 | Kellogg | 146—72 |

FOREIGN PATENTS 222,927  7/1959  Australia.

EVON C. BLUNK, *Primary Examiner.*

M. L. AJEMAN, *Assistant Examiner.*